(12) United States Patent
Fawzy

(10) Patent No.: US 11,146,418 B2
(45) Date of Patent: Oct. 12, 2021

(54) METHOD FOR CREATING INTERNET NETWORK ACCESS ACCOUNTS

(71) Applicant: Anas Fawzy, Paris (FR)

(72) Inventor: Anas Fawzy, Paris (FR)

( * ) Notice: Subject to any disclaimer, the term of this patent is extended or adjusted under 35 U.S.C. 154(b) by 54 days.

(21) Appl. No.: 16/613,503

(22) PCT Filed: May 5, 2018

(86) PCT No.: PCT/FR2018/000119
§ 371 (c)(1),
(2) Date: Nov. 14, 2019

(87) PCT Pub. No.: WO2018/211179
PCT Pub. Date: Nov. 22, 2018

(65) Prior Publication Data
US 2021/0176087 A1    Jun. 10, 2021

(30) Foreign Application Priority Data

May 15, 2017 (FR) ..................................... 1754245

(51) Int. Cl.
*H04L 12/28* (2006.01)
*H04L 29/06* (2006.01)

(52) U.S. Cl.
CPC ...... *H04L 12/2887* (2013.01); *H04L 63/0846* (2013.01); *H04L 63/0884* (2013.01)

(58) Field of Classification Search
CPC .. H04W 36/02; H04W 36/0055; H04W 36/08
See application file for complete search history.

(56) References Cited

U.S. PATENT DOCUMENTS

| 6,856,676 B1 * | 2/2005 | Pirot ................ H04L 29/06027 |
| | | 379/201.01 |
| 7,099,944 B1 | 8/2006 | Anschutz et al. |

(Continued)

FOREIGN PATENT DOCUMENTS

| EP | 2 337 388 A2 | 6/2011 |
| EP | 2 871 876 A1 | 5/2015 |

(Continued)

OTHER PUBLICATIONS

International Search Report dated Jul. 19, 2018 in corresponding International application No. PCT/FR2018/000119;4 pages.

*Primary Examiner* — Duc C Ho
(74) *Attorney, Agent, or Firm* — Maier & Maier, PLLC

(57) ABSTRACT

A method for creating accounts for accessing the Internet network through a unique terminating point of a premise provided with an internal handler includes transmitting to the internal handler, through the terminating point, numerical data associated with the connection parameters of the native account of the first subscriber, and numerical data associated with connection parameters of a second Internet network access account of a second subscriber, for each of the two subscribers to connect to the Internet network with his own connection parameters through the terminating point shared between the two the subscribers. The method further includes connecting a modem-router parameterized with the connection parameters of the second, to the internal handler, and transmitting to the modem-router a session authorization signal authorizing the modem-router to process the numerical data associated with the connection parameters of the second account and which travel through the terminating point.

17 Claims, 8 Drawing Sheets

(56) References Cited

U.S. PATENT DOCUMENTS

| | | | |
|---|---|---|---|
| 8,291,469 B1 | 10/2012 | Bugenhagen | |
| 2006/0259927 A1 | 11/2006 | Acharya et al. | |
| 2009/0199254 A1* | 8/2009 | White | H04N 21/44008 725/110 |
| 2010/0083303 A1* | 4/2010 | Redei | H04N 21/2743 725/32 |
| 2010/0115113 A1* | 5/2010 | Short | G06Q 50/163 709/228 |
| 2020/0077269 A1* | 3/2020 | Fawzy | H04L 63/08 |

FOREIGN PATENT DOCUMENTS

| | | |
|---|---|---|
| FR | 2 878 100 A1 | 5/2006 |
| FR | 3 000 857 A1 | 7/2014 |

* cited by examiner

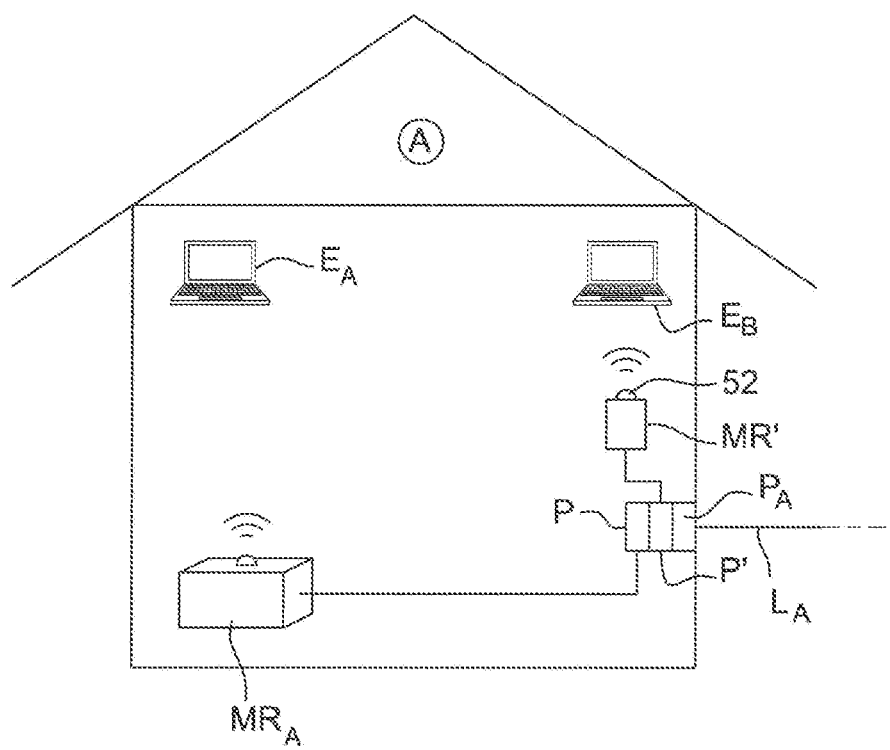
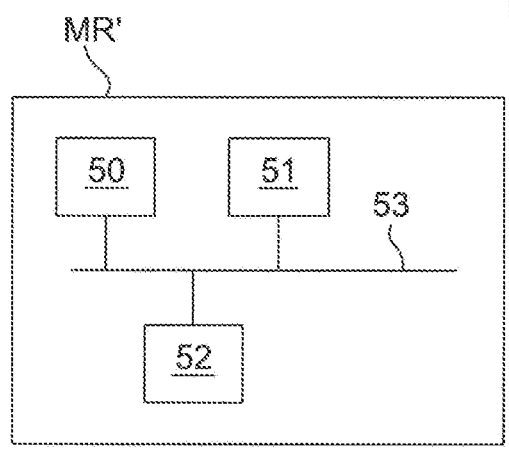
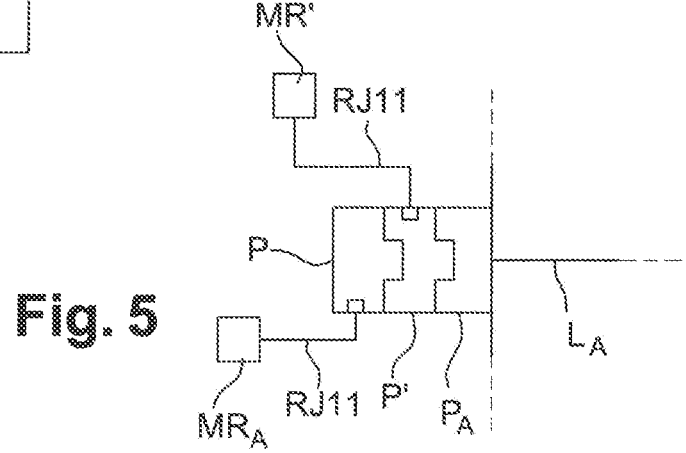

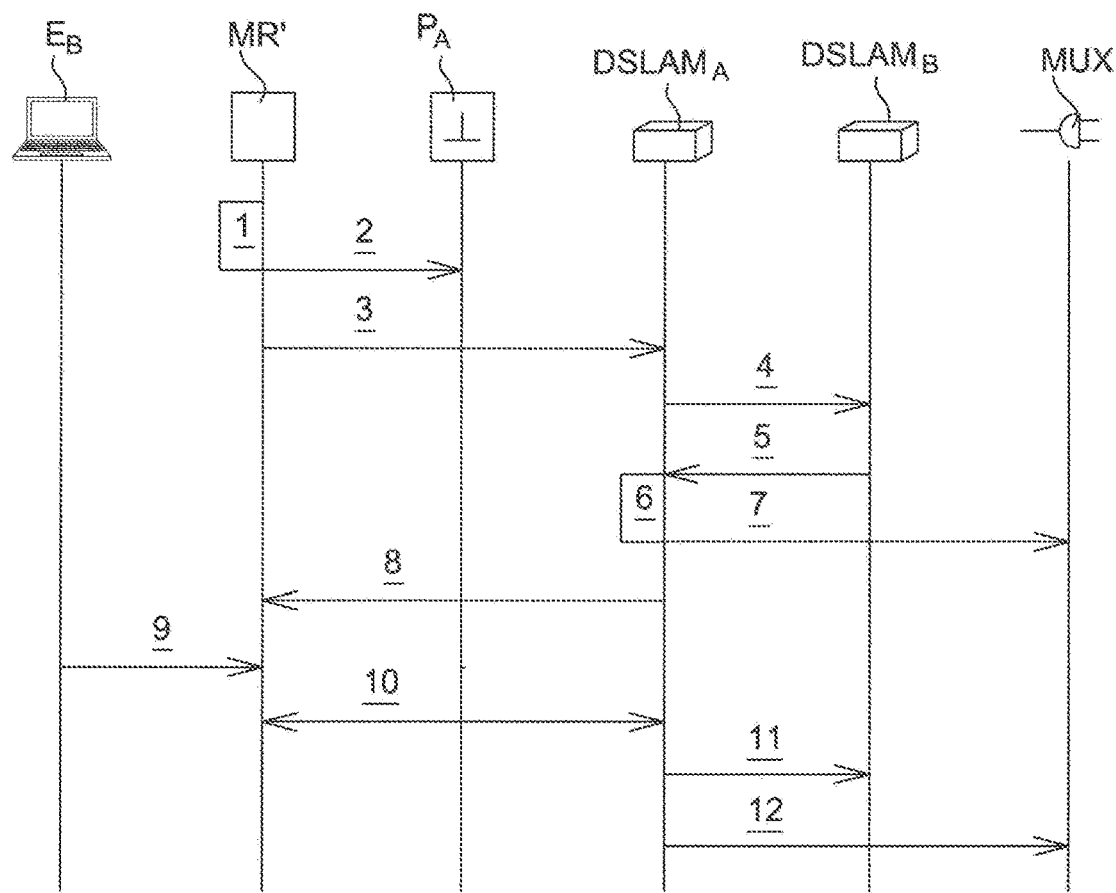
Fig. 8
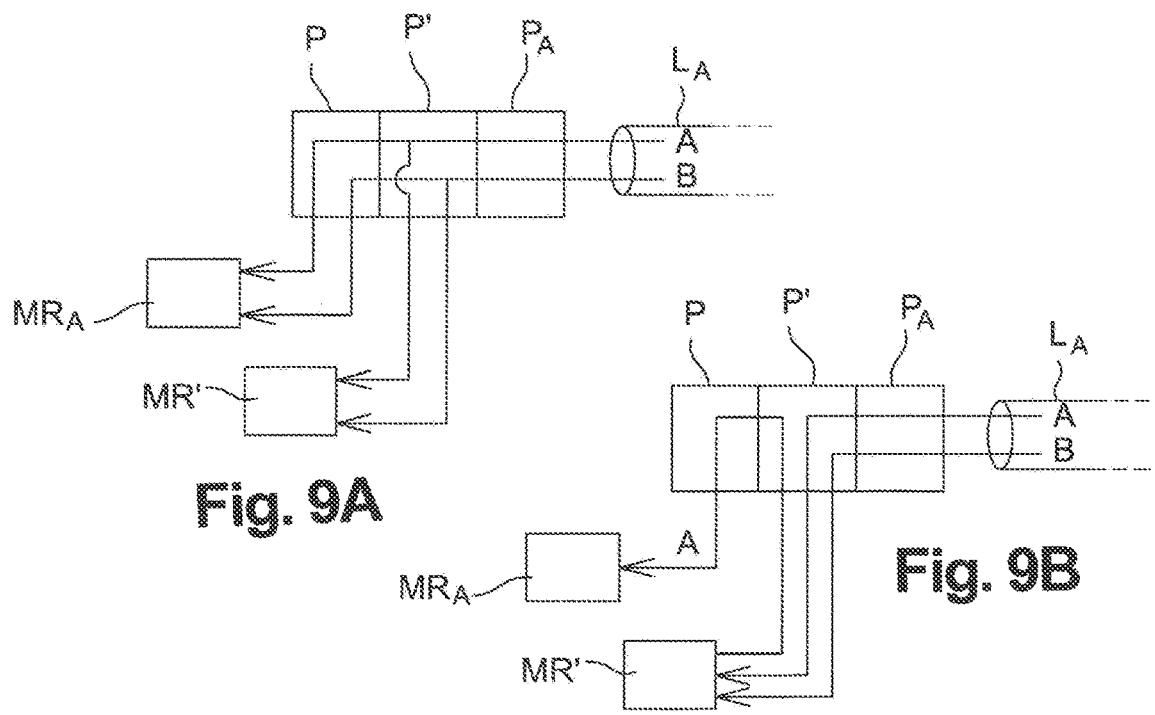
Fig. 9A
Fig. 9B

METHOD FOR CREATING INTERNET NETWORK ACCESS ACCOUNTS

FIELD

The aim of the invention is a method for creating accounts for accessing the Internet network. Notably it relates to the technical field of Internet handler networks and more specifically to the exchange of data conveyed by the Internet.

BACKGROUND

Patent document US 2006/0259927 (ACHARYA) describes a technique for handling television or radio services while roaming. The technique described enables a user to access television or radio services to which he is subscribed even when he is away from his place of residence. This patent document describes a network for distributing television or radio signals.

FIG. 1 schematizes the arrangement of the main elements constituting an Internet handler network known by the person skilled in the art.

This type of network generally comprises a telephone center wherein terminate the lines of the subscribers A and B, regardless of their Internet access provider (or operator). This telephone center is commonly known as MDF (Main Distribution Frame). The MDF usually comprises a distribution frame R, and an unbundling room where the $DSLAM_A$, $DSLAM_B$ of the Internet access providers are reunited. The distribution frame R is adapted to sort the transmission lines (copper, coaxial cables, optical fibers, satellites, etc.) LA, LB of the subscribers A and B. The transmission lines LA, LB are thus sorted in the distribution frame R in order to subsequently be relayed towards the respective $DSLAM_A$, $DSLAM_B$ of the Internet access providers, via optical fibers $L_{FA}$, $L_{FB}$. By way of example, the $DSLAM_A$ is an item of equipment of the Orange® Internet access provider and the $DSLAM_B$ is an item of equipment of the SFR® Internet access provider.

The DSLAM (Digital Subscriber Line Access Multiplexer) are equipment making the connection between the transmission lines LA, LB of subscribers A and B and Internet. Once concentrated in the $DSLAM_A$, $DSLAM_B$, the numerical data transported by the transmission lines LA, LB are dispatched to the various Internet networks $RI_A$, $RI_B$ respectively managed by the Internet access providers.

Sub-distribution frames $SR_A$, $SR_B$ may be installed in the MDF, these sub-distribution frames being specific to each provider and make it possible to create the interface between the main distribution frame R and the ports of the $DSLAM_A$, $DSLAM_B$.

The terminating point $P_A$, $P_B$ is the physical access point by which a subscriber A, B obtains the access to the Internet network $RI_A$, $RI_B$. This terminating point $P_A$, $P_B$ is in general located in the premises (dwelling, offices, etc.) of the subscriber A, B. It is intended to separate the local loop of the internal handler from the premises of the subscriber A, B. This local loop is the portion of transmission line LA, LB located between the terminating point $P_A$, $P_B$ and the central distribution frame R. The terminating point $P_A$, $P_B$ thus authorizes the transmission of numerical data to the internal handler.

The internal handler of each subscriber A, B may be provided with a native modem-router $MR_A$, $MR_B$. Each modem-router $MR_A$, $MR_B$ makes it possible to establish a connection between one or more items of electronic equipment $E_A$, $E_B$ and the Internet network $RI_A$, $RI_B$. Said items of equipment $E_A$, $E_B$ are, for example, a fixed or portable computer, a tablet, a Smartphone, a television, a home automation device, etc. The numerical data traveling between the internal handler of the subscriber A, B and the Internet network $RI_A$, $RI_B$, are directed via the modem-router $MR_A$, $MR_B$ and travel on the corresponding transmission line LA, LB. The distribution frame R transports these data towards the corresponding $DSLAM_A$, $DSLAM_B$ which subsequently transfers same towards the associated Internet network $RI_A$, $RI_B$. The communication between the modem-routers $MR_A$, $MR_B$ and the $DSLAM_A$, $DSLAM_B$ is, for example, performed using the ADSL (Asymmetric Digital Subscriber Line) technology.

Each subscriber A, B is holder of an account for accessing the Internet network $RI_A$, $RI_B$, the account of which is attributed by the provider with which the subscriber A, B is affiliated. This access account brings into play a plurality of connection parameters adjusted in order to adapt the numerical data intended for or emitted by the items of equipment $E_A$, $E_B$ of the subscriber A, B to the specific configuration of the Internet network $RI_A$, $RI_B$ of the provider and/or to a parametrization specific to the subscriber A, B (e.g.: parental control, firewall, etc.). Therefore, it can be considered that the numerical data output or input from a terminating point are associated with the connection parameters of the access account of the subscriber.

Each access provider attributes unique connection parameters to its subscribers. These connection parameters notably include a unique subscriber identifier (the equivalent of an IMSI (International Mobile Subscriber Identity) identifier), a private security key (e.g.: WEP, WAP, WAP2 key, etc.) and optionally certain rights and/or restrictions open to the subscribers A, B, for example, access rights to pay-per-view television channels, a parental control, a firewall, etc. Each subscriber A, B therefore parametrizes his native modem-router $MR_A$, $MR_B$ with his own connection parameters. Each item of equipment $E_A$, $E_B$ of the subscriber A, B then connects to the respective native modem-router $MR_A$, $MR_B$ with the private security key and identifies itself to the native modem-router with its MAC (Media Access Control) address.

The routing rules mean that in a configuration such as described in FIG. 1, the response to a request passing through a terminating point will inevitably use the same terminating point at the time of the return thereof. Furthermore, a terminating point can only be the subject of a single subscription. The subscriber cannot take a subscription with an access provider if he is already subscribed to another.

By way of example, let us take the case where the subscriber A rents all or part of his dwelling premises to the subscriber B, this rental being, for example, carried out from a platform of the Airbnb® type. The connection parameters of the access account of the subscriber B open thereto, for example, the access rights to pay-per-view television channels, which rights are not authorized with the connection parameters of the access account of the subscriber A.

The subscriber B can only connect to Internet if the subscriber A communicates thereto his own connection parameters in order that the items of equipment $E_B$ of the subscriber B can be recognized by the modem-router $MR_A$ and communicate with the latter. All of the numerical data exchanged from the items of equipment of the subscriber B will then travel via the Internet network $RI_A$ of the provider of the subscriber A. This has certain risks for the subscriber A, for example, in the case where the subscriber B exchanges sensitive data and/or visits prohibited Internet sites, since it is not possible to identify and to track the data exchanges initiated by the subscriber B from same initiated by the subscriber A. Also, the subscriber A practically never communicates his connection parameters to the subscriber B, the latter then being deprived of Internet access. And even if the subscriber A communicates his connection parameters to the subscriber B, the latter will not be able to benefit from his own rights and/or restrictions (access rights to pay-per-view television channels, parental control, firewall, etc.).

The invention aims to overcome this state of things. In particular, one aim of the invention is to be able to create distinct accounts for accessing the Internet network through a unique terminating point of a premises provided with an internal handler.

Another aim of the invention is to be able to create these distinct accounts in a simple, reliable, automated, secure manner.

An additional aim of the invention is to be able to identify and track the data exchanges associated with each of the distinct Internet network access accounts.

SUMMARY

The solution proposed by the invention is a process for creating accounts for accessing the Internet network through a unique terminating point of a premises provided with an internal handler, the terminating point is adapted to authorize the transmission of numerical data to the internal handler, the numerical data are associated with connection parameters of a first native Internet network access account of a first subscriber. The method comprises the steps of:
  transmitting to the internal handler, through the terminating point, in addition to the numerical data associated with the connection parameters of the native account of the first subscriber, other numerical data associated with connection parameters of a second Internet network access account of a second subscriber,
    the connection parameters of the second account are different from the connection parameters of the first native account.

So that each of the two subscribers can connect to the Internet network with his own connection parameters through the terminating point shared between the two subscribers, the method further comprises the steps of:
  parametrizing a modem-router with the connection parameters of the second account,
  connecting the modem-router to the internal handler,
  transmitting to the modem-router a session authorization signal authorizing said modem-router to process the numerical data associated with the connection parameters of the second account and which travel through the terminating point, which signal is emitted from an item of equipment of the Internet access provider of the first subscriber.

By using the aforementioned example, the subscriber A has his own native account and can continue to use same to access the Internet network of his provider. The modem-router (same of the subscriber A or another dedicated modem-router) is parametrized with the connection parameters of the subscriber B. The latter can then connect to the Internet network of his own provider, with his own connection parameters, and by using the terminating point of the subscriber A that is now shared. The numerical data output or input from the terminating point of the subscriber A are associated with the connection parameters of the native account and with the connection parameters of the account of the subscriber B.

Other advantageous features of the invention are listed hereinbelow. Each one of these features can be considered individually or combined with the remarkable features defined hereinabove, and may be the subject matter, where applicable, of one or more divisional patent applications:
  Advantageously: — the modem-router generates an authentication request containing identification data of the second access account and transmits this authentication request to an item of equipment of the Internet access provider of the first subscriber, the connection of the modem-router to the internal handler, or the insertion of a secure removable media device into a connection interface of the modem-router, being the element triggering the generation and the transmission of said authentication request; — the item of equipment of the Internet access provider of the first subscriber generates and transmits to an item of equipment of the Internet access provider of the second subscriber a polling request aiming to verify that the second subscriber is indeed affiliated with the access provider identified in the authentication request, the receipt of the authentication request being the element triggering the generation and the transmission of the authentication request;—the item of equipment of the Internet access provider of the second subscriber verifies that the second subscriber is indeed affiliated with the access provider identified in the authentication request, the receipt of the polling request being the element triggering the verification procedure; and, in case of positive verification, the item of equipment of the Internet access provider of the second subscriber generates and transmits to the item of equipment of the Internet access provider of the first subscriber an authorization signal;—the receipt of the authorization signal results in the generation and the transmission of the session authorization signal, by the item of equipment of the Internet access provider of the first subscriber to the modem-router.
  The method advantageously includes a step of connecting the terminating point to a transmission line connected to an item of equipment of an Internet access provider managing the native account and multiplexing this transmission line so that the numerical data associated with the connection parameters of the second account of the second subscriber and the numerical data associated with the connection parameters of the native account of the first subscriber simultaneously travel through this transmission line.
  The method advantageously includes a step of integrating into the session authorization signal data relating to the connection parameters of the second account, the receipt of the session authorization signal by the modem-router, resulting in the automatic parametrization of the modem-router with said connection parameters.
  In one alternative embodiment, the method advantageously includes a step of parametrizing the modem-router:—by connecting the modem-router to an electronic device serving as interface; —then by manually entering the connection parameters of the second account through this electronic device acting as interface;—and by saving these connection parameters in a memory of the modem-router.
  In one alternative embodiment, the method advantageously includes a step of parametrizing the modem-router:—by connecting the modem-router to another modem-router already parametrized with the connection parameters of the second account;—and copying all of the connection parameters saved in the other modem-router in a memory of the modem-router.

In one alternative embodiment, the method advantageously includes a step of:—saving in a secure removable media device the connection parameters of the second account;—equipping the modem-router with a connection interface adapted to receive the secure removable media device; —the insertion of the secure removable media device into the connection interface is a triggering element resulting in the automatic parametrization of the modem-router with the connection parameters of the second account saved in the secure removable media device.

In one alternative embodiment, the method advantageously includes a step of:—saving in a secure removable media device the identification data of the second account;—equipping the modem-router with a connection interface adapted to receive the secure removable media device;—the insertion of the secure removable media device into the connection interface is a triggering element resulting in the automatic implementation of a logical computer process leading to the automatic parametrization of the modem-router with the connection parameters of the second account.

The method advantageously includes a step of connecting the modem-router between the terminating point and a native modem-router connected to the internal handler, which native modem-router is parametrized with the connection parameters of the first native account, an item of equipment of the second subscriber not being able to communicate with the native modem-router without knowledge of the connection parameters of the first native account and an item of equipment of the first subscriber not being able to communicate with the modem-router without knowledge of the connection parameters of the second account.

The method advantageously includes a step of receiving in the native modem-router, the numerical data associated with the connection parameters of the first native account and the numerical data associated with the connection parameters of the second account which travel through the terminating point, and only processing in the native modem-router the numerical data associated with the connection parameters of the first native account.

In one alternative embodiment, the method advantageously includes a step of:—receiving in the modem-router, the numerical data associated with the connection parameters of the first native account and the numerical data associated with the connection parameters of the second account which travel through the terminating point;—only processing in the modem-router the numerical data associated with the connection parameters of the second account;—sending back towards the native modem-router and from the modem-router, the numerical data associated with the connection parameters of the first native account.

Advantageously, the connection of the modem-router to the internal handler is a triggering element resulting in the automatic implementation of a logical computer process leading to the multiplexing of the transmission line.

Advantageously, the disconnection of the modem-router from the internal handler is a triggering element resulting in the automatic implementation of a logical computer process leading to the stopping of the multiplexing of the transmission line.

Advantageously, the insertion of the secure removable media device into the connection interface is a triggering element resulting in the implementation of a logical computer process leading to the multiplexing of the transmission line.

Advantageously, the withdrawal of the secure removable media device from the connection interface is a triggering element resulting in the automatic implementation of a logical computer process leading to the stopping of the multiplexing of the transmission line.

The method advantageously includes a step of parametrizing the modem-router with the connection parameters of the second account and with the connection parameters of the first native account so that the modem-router processes the numerical data associated with the connection parameters of the first native account and the numerical data associated with the connection parameters of the second account, and which travel through the terminating point, the modem-router being adapted to be used simultaneously by the first subscriber and the second subscriber, same keeping their own Internet network access accounts and their own connection parameters.

Advantageously, in response to the receipt of the session authorization signal, the modem-router generates and transmits a session electronic signature to an item of equipment of the Internet access provider of the second subscriber and/or to the Internet access provider of the first subscriber, which signature is used to track the connection histories of the second subscriber when he uses the modem-router from the internal handler of the dwelling of said first subscriber.

BRIEF DESCRIPTION OF THE DRAWINGS

Other advantages and features of the invention shall appear better when reading the following description of a preferred embodiment, in reference to the attached drawings, provided as non-limiting examples for the purpose of information and wherein:

FIG. 3 illustrates the connection, during line cutoff, of a modem-router in accordance with the invention, FIG. 4 schematizes the arrangement of various components of the modem-router illustrated in FIG. 3, FIG. 5 schematizes the connection, during line cutoff, of a modem-router in accordance with the invention, FIG. 6 schematizes the arrangement of the main elements constituting an Internet handler network in accordance with a first embodiment of the invention, according to a second alternative, FIG. 7 schematizes the arrangement of the main elements constituting an Internet handler network in accordance with a first embodiment of the invention, according to a third alternative, FIG. 8 illustrates various steps implemented in the method subject matter of the invention, with the modem-router illustrated in FIG. 3, FIG. 9A illustrates an orientation of the data flows traveling through a modem-router in accordance with the invention and through a native modem-router, FIG. 9B illustrates another orientation of the data flows traveling through a modem-router in accordance with the invention and through a native modem-router.

DETAILED DESCRIPTION

Figure 1:
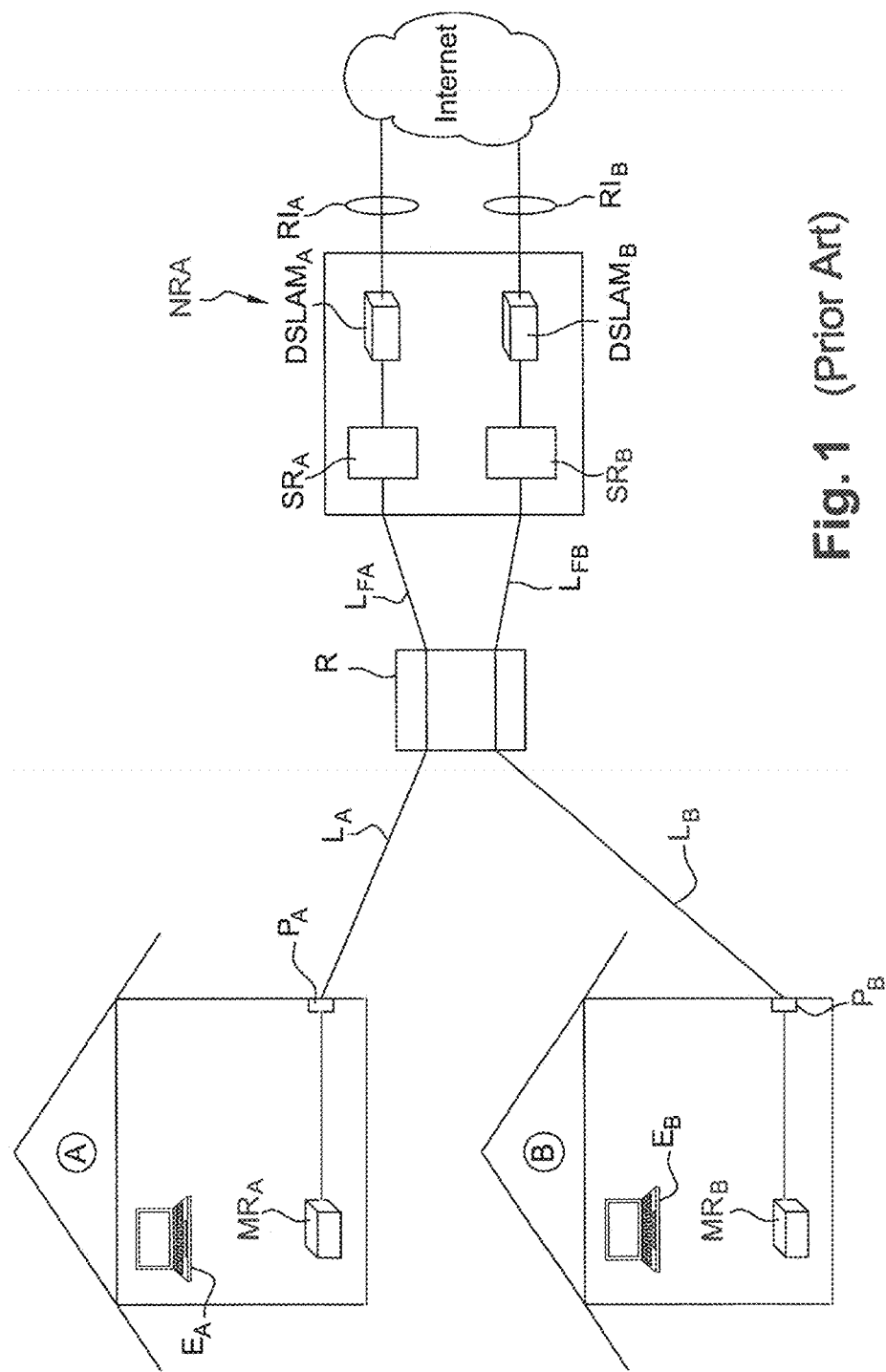
FIG. 1 aforementioned schematizes the arrangement of the main elements constituting an Internet handler network known by the person skilled in the art, FIG. 2 schematizes the arrangement of the main elements constituting an Internet handler network in accordance with a first embodiment of the invention, according to a first alternative.

The method subject matter of the invention consists of a coherent sequence of steps for achieving a desired result. These steps result in the handling of physical elements, notably signals (electric or magnetic) capable of being stored, transferred, combined, compared, etc.

The method is implemented through the intermediary of computer applications run by computer devices. In the interest of clarity, it should be understood within the meaning of the invention that "the device does something" means "the computer application run by the processor or microprocessor of the device does something". Just like "the computer application does something" means "the computer application run by the processor or microprocessor of the device does something".

Again, in the interest of clarity, the present invention makes reference to one or more "logical computer processes". The latter correspond to the actions or results obtained by the running of instructions of various computer applications. Also, it should also be understood within the meaning of the invention that "a logical computer process does something" means "the instructions of one or more computer applications run by one or more processors or microprocessors do something".

The implementation of the method subject matter of the invention requires the use of a modem-router MR'. The latter may be in the form of a box of relatively reduced dimensions, having, at most, the overall size of an Internet box.

By referring to FIG. 4, the modem-router MR' notably comprises one or more processors or microprocessors 50, one or more memories 51, a network interface 52, which are mutually connected via a bus 53. One or more computer applications—or computer programs—are saved in the memory or memories 51 and the instructions of which, when they are run by the processor or processors 50 make it possible to produce the functions described above in the description and notably the modulation, demodulation, multiplexing, demultiplexing of numerical data.

The memory or memories 51 must be considered as a storage device also adapted to store data and/or data files. It may concern a native memory or an add-on memory such as a Secure Digital (SD) card. The MAC address of the modem-router MR' is saved in the memory 51, the MAC address being unique is pre-saved in the factory.

The network interface 52 is a wired or wireless communication interface adapted to establish a communication with the items of equipment $E_B$ of the subscriber B, by using, for example, a private security key (e.g.: WEP, WAP, WAP2 key, etc.). The network interface 52 may, for example, comprise a Wi-Fi transmitter/receiver, an Ethernet connection, a PLC (Power-line Communication) connection, a Bluetooth module, or any other means of connection to the modem-router MR'. In general, the network interface 52 has the function of managing the connections between the modem-router MR' and the items of electronic equipment $E_B$ of the subscriber B.

The modem-router MR' may be parametrized beforehand with the connection parameters of an Internet network access account. In order to follow the aforementioned example, the modem-router MR' is, for example, parametrized with the connection parameters of the subscriber B. These connection parameters notably include the unique identifier of the subscriber B, an item of identification data of the Internet access provider of the subscriber B (which indication may be included in the unique identifier), a private security key (e.g.: WEP, WAP or WAP2 key) and optionally certain rights and/or restrictions open to the subscriber B (e.g.: access rights to pay-per-view television channels, parental control, firewall, landline telephone number, etc.).

This parametrization of the modem-router MR' may be performed in the dwelling of the subscriber B, prior to his installation in the dwelling of the subscriber A. The parametrization may also be performed directly in the dwelling of the subscriber A. Various parametrization methods are then possible.

The subscriber B may, for example, use a computer or a Smartphone (or another electronic device) that he connects in a wired (for example, with an Ethernet cable) or wireless (for example, by Wi-Fi) manner to the modem-router MR'. This computer or this Smartphone acts as interface so that the subscriber B enters his connection parameters manually. These connection parameters thus input are saved in the memory 51 of the modem-router MR'.

In an alternative embodiment, the subscriber B connects in a wired (for example, with an Ethernet cable) or wireless (for example, by Wi-Fi) manner the modem-router MR' to his native modem-router $MR_B$. In response to this connection, or in response to the activation of a dedicated key installed on the box of the modem-router MR', all of the connection parameters saved in the native modem-router $MR_B$ are copied in the memory 51 of the modem-router MR'.

In another alternative embodiment, the connection parameters may be saved in a secure removable media device such as a smart card, SIM (Subscriber Identity Module) card, SD (Secure Digital) card or a USB (Universal Serial Bus) stick. The Internet access provider of the subscriber B may provide him with the pre-parametrized media device that can then be inserted into a generic modem-router MR' purchased in a store by the subscriber B. Such card may also be inserted into a generic modem-router MR' purchased in a store by the subscriber A and installed in the dwelling of the latter as explained above in the description in reference to FIGS. 10 and 11. The subscriber B is thus only recognized by his data registered on his removable media device, and not by his physical or geographic place of residence as in prior art.

Figure 2:
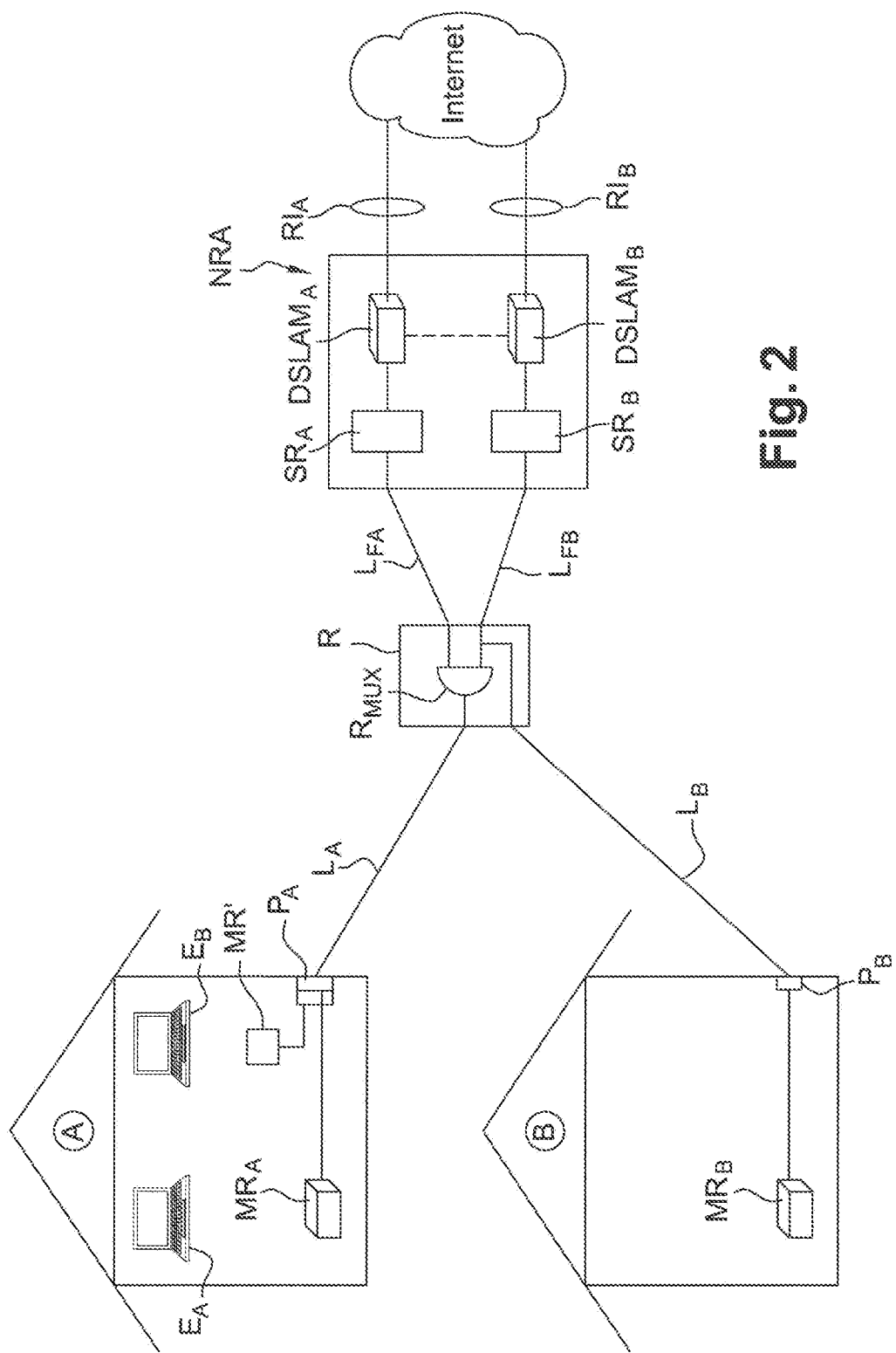

In FIGS. 2 and 3, the modem-router MR' is connected during line cutoff, between the terminating point $P_A$ of the dwelling of the subscriber A and the native modem-router $MR_A$ of the subscriber A. Said solution has the advantage, for the subscriber A, of keeping his native modem-router $MR_A$. It is reminded that the modem-router MR' may be installed either by the subscriber A, or by the subscriber B at the time of his installation in the dwelling of the subscriber A.

The connection of the modem-router MR' during line cutoff is schematized in FIG. 5. For example, a telephone plug adapter, referenced P', is used and advantageously an ASDL telephone plug adapter, the male part of which is connected to the female part of the physical T-plug installed in the wall of the dwelling and forming the terminating point $P_A$. The modem-router MR' is connected to the telephone plug adapter P', for example, by means of an RJ11 cable. The female part of the telephone plug adapter P' is connected to the male part of the T-plug, referenced P, to which is connected a native modem-router $MR_A$. The connection between the plug P and the native modem-router $MR_A$ may also be produced by means of an RJ11 cable.

The subscribers A and B may each have a different Internet access provider. For example, the subscriber A is affiliated with Orange® and the subscriber B is affiliated with SFR®. The $DSLAM_A$ and $DSLAM_B$ may be located in the same MDF or in MDFs that are distinct and remote from one another.

In FIG. 2, a multiplexing is performed at the main distribution frame R so as to simultaneously pass through the transmission line LA of the subscriber A, not only the numerical data associated with the connection parameters of the subscriber A, but also the numerical data associated with the connection parameters of the subscriber B. These various data therefore pass through the transmission line LA and through the terminating point $P_A$ at the same time. Such multiplexing is preferably a frequency multiplexing. A multiplexer $R_{MUX}$ installed in the distribution frame R provides the multiplexing of the transmission lines LA and LB. Optical fibers $L_{FA}$ and $L_{FB}$ linking the distribution frame R respectively to the $DSLAM_A$ and to the $DSLAM_B$ are connected to the inputs of the multiplexer $R_{MUX}$. The transmission line LA for its part is connected to the output of the multiplexer $R_{MUX}$.

Figure 6:
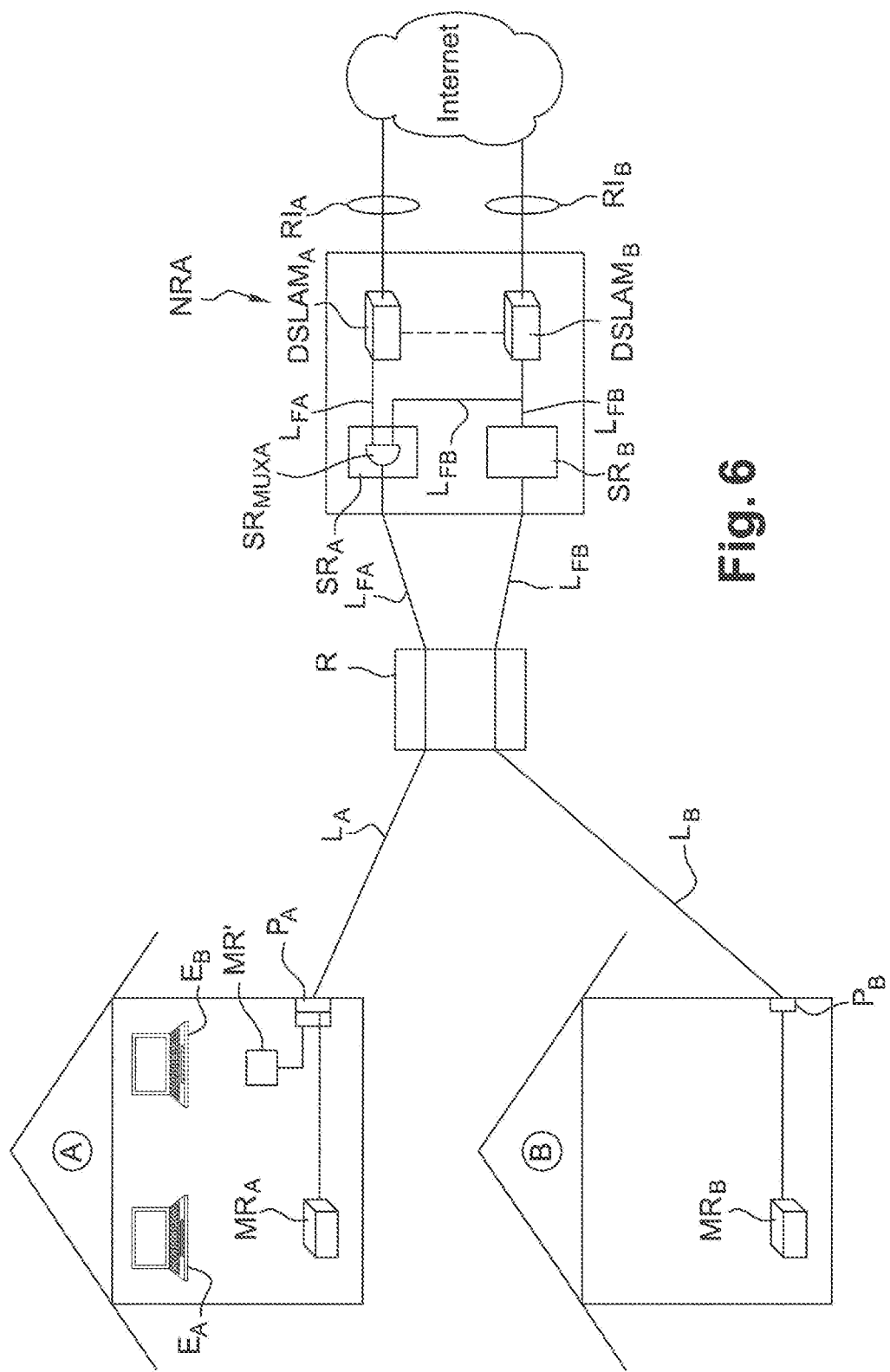

On the alternative embodiment in FIG. 6, the multiplexing is performed at the sub-distribution frame $SR_A$. The optical fibers $L_{FA}$ and $L_{FB}$ from the $DSLAM_A$ and $DSLAM_B$ are connected to the inputs of the multiplexer $SR_{MUXA}$. The optical fiber $L_{FA}$ linking the sub-distribution frame $SR_A$ to the distribution frame R is connected to the output of the multiplexer $SR_{MUXA}$.

Figure 7:
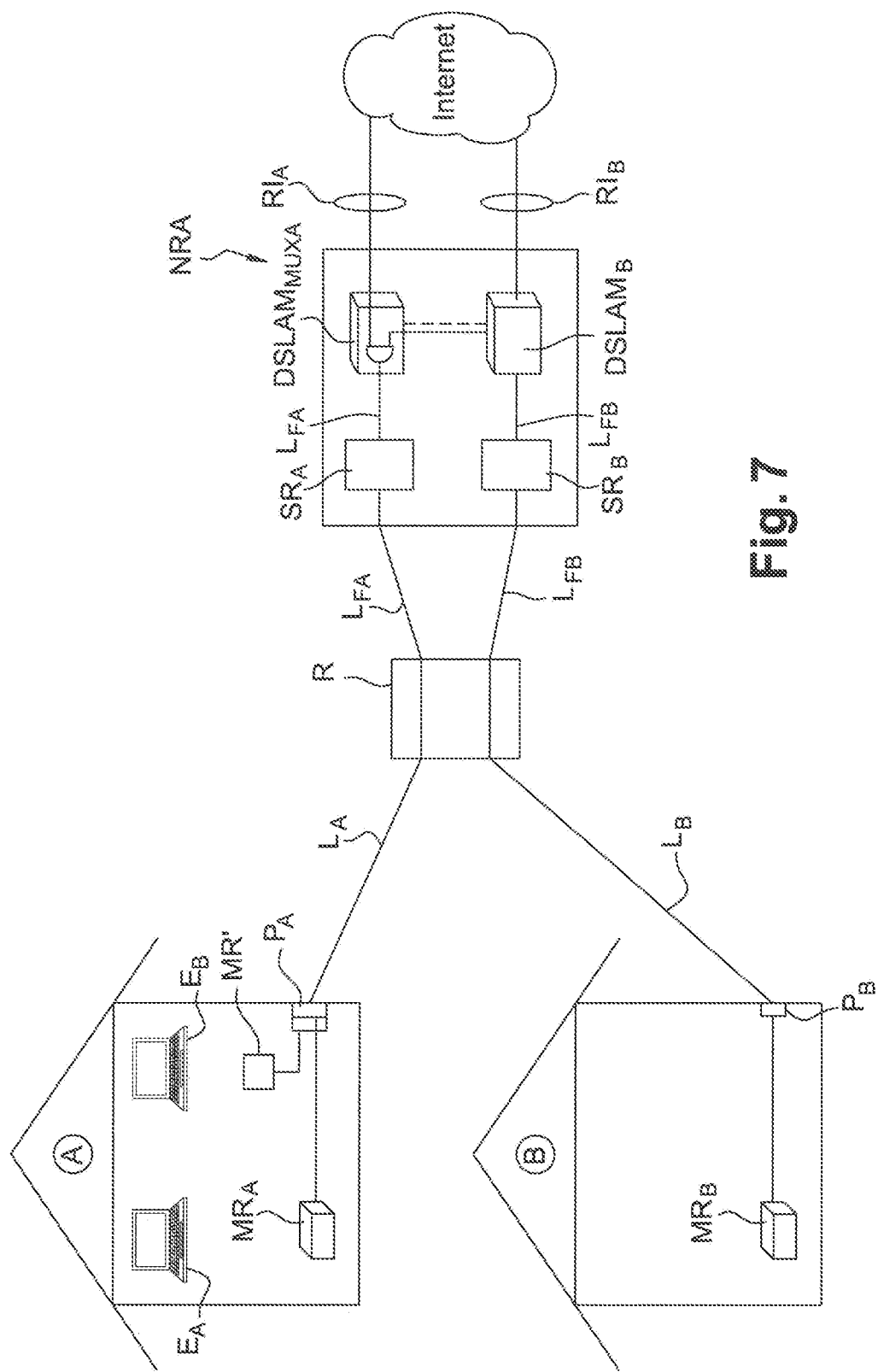

On another alternative embodiment in FIG. 7, the multiplexing is performed directly in the $DSLAM_A$. The optical fibers $L_{FA}$ and $L_{FB}$ are connected to the inputs of the multiplexer $DSLAM_{MUXA}$. The optical fiber $L_{FA}$ linking the $DSLAM_A$ to the sub-distribution frame $SR_A$ is connected to the output of the $DSLAM_{MUXA}$ multiplexer.

FIG. 8 illustrates various steps implemented in the method subject matter of the invention.

Event 1: The modem-router MR' is parametrized with the connection parameters of the Internet network access account of the subscriber B.

Step 2: Connection of the modem-router MR' during line cutoff, between the terminating point $P_A$ and the native modem-router $MR_A$ of the subscriber A. This Step 2 may be implemented before or after Event EV1.

Step 3: The modem-router MR' generates and transmits an authentication request to the Internet access provider of the subscriber A. The connection of the modem-router MR' to the internal handler is the element triggering the generation and the transmission of the authentication request. This authentication request is transmitted via the transmission line LA, preferably in destination of the $DSLAM_A$. Nevertheless, the authentication request may be transmitted to another item of equipment of the Internet access provider of the subscriber A, for example, a dedicated Internet server. Said authentication request notably contains numerical data corresponding to the MAC address of the modem-router MR', the unique identifier of the subscriber B and an item of identification data of the Internet access provider of the subscriber B, and more generally contains identification data of the access account of the subscriber B.

Step 4: The Internet access provider of the subscriber A generates and transmits to the Internet access provider of the subscriber B, a polling request aiming to verify that the subscriber B is indeed affiliated with the access provider identified in the authentication request. The receipt of the authentication request is the element triggering the generation and the transmission of the polling request. The polling request may contain all or part of the numerical data contained in the authentication request. In the figures attached, it is the $DSLAM_A$ that generates and transmits the polling request to the $DSLAM_B$, the communication between the $DSLAM_A$ and the $DSLAM_B$ being schematized by the dotted line. The generation and the transmission of the polling request may be initiated from another item of equipment of the Internet access provider of the subscriber A and/or transmitted to another item of equipment of the Internet access provider of the subscriber B, for example, a dedicated server. The communication between the two providers is therefore not necessarily produced between the respective DSLAM thereof but may involve other equipment.

Step 5: The Internet access provider of the subscriber B verifies that the subscriber B is indeed affiliated therewith. The receipt of the polling request is the element triggering the verification procedure. In the figures attached, it is the $DSLAM_B$ that performs such verification, but this task may be produced by another item of equipment of the Internet access provider of the subscriber B. In practice, the verification consists of polling a table stored in a database, which table comprising a list of identification data associated with respective subscriber access accounts. If the identification data are stored in the table, the Internet access provider of the subscriber B generates and transmits to the Internet access provider of the subscriber A an authorization signal. In the figures attached, it is the $DSLAM_B$ that generates and transmits the authorization signal to the $DSLAM_A$.

Event 6: In response to the receipt of the authorization signal, the Internet access provider of the subscriber A opens access rights to the subscriber B. The receipt of the authorization signal is the element triggering the opening of access rights. Such access rights are notably access rights to his equipment, which rights may, for example, be limited over time (Internet session limited over a period of 1 day to 15 days, for example) and/or restricted to a portion of bandwidth. To this end, the subscriber A may, via the interface of a dedicated Internet site, tell his access provider beforehand that he plans to rent his dwelling for a given period, that the sharing of his terminating point $P_A$ is only authorized for this given period, for only a portion of his bandwidth.

Step 7: The Internet access provider of the subscriber A generates and transmits to the multiplexer MUX ($R_{MUX}$, $SR_{MUXA}$ or $DSLAM_{MUXA}$), a control signal in order to multiplex the transmission line LA of the subscriber A, so as to simultaneously pass through this transmission line LA (and therefore the terminating point $P_A$) not only the numerical data associated with the connection parameters of the subscriber A, but also the numerical data associated with the connection parameters of the subscriber B. In FIG. 8, it is the $DSLAM_A$ that generates and transmits such control signal.

Step 8: The Internet access provider of the subscriber A generates and transmits to the modem-router MR', a session authorization signal. In FIG. 8, it is the $DSLAM_A$ that generates and transmits this session authorization signal.

Step 9: The item or items of equipment $E_B$ of the subscriber B can now connect to the modem-router MR', via a wired (e.g.: Ethernet) or wireless (e.g.: Wi-Fi) connection and navigate on the Internet with the connection parameters of the subscriber B. The item or items of equipment $E_B$ of the subscriber B may notably communicate with the modem-router MR', via the interface 52, with the private security key (e.g.: WEP, WAP or WAP2 key) associated with the connection parameters of the subscriber B (FIG. 3). However, the subscriber B not knowing the connection parameters of the access account of the subscriber A, and notably his private security key, the item or items of equipment $E_B$ of the subscriber B cannot communicate with the native modem-router $MR_A$. And vice versa for the items of equipment $E_A$ of the subscriber A that cannot communicate with the modem-router MR'. The requests emitted by an item of equipment $E_B$ of the subscriber B pass through the terminating point $P_A$, via the modem-router MR', and travel through the transmission line LA up to the multiplexer $R_{MUX}$, $SR_{MUXA}$ or $DSLAM_{MUXA}$. The latter orients such requests towards the items of equipment of the Internet access provider of the subscriber B and in particular towards the $DSLAM_B$ which transfers same subsequently towards the Internet network $RI_B$. The numerical data of responses to said requests (e.g.: access to pay-per-view television channels, parental control, firewall, landline telephone number, etc.), return towards the Internet network $RI_B$, then towards the $DSLAM_B$ up to reaching the multiplexer $R_{MUX}$, $SR_{MUXA}$ or $DSLAM_{MUXA}$ where they are multiplexed in order to travel through the transmission line LA and pass back through the terminating point $P_A$ and reach the modem-router MR'. In the case where requests are emitted at the same time by an item of equipment $E_A$ of the subscriber A and by an item of equipment $E_B$ of the subscriber B, the multiplexer $R_{MUX}$, $SR_{MUXA}$ or $DSLAM_{MUXA}$, performs a demultiplexing so that: the requests emitted by an item of equipment $E_A$ are oriented towards the items of equipment of the Internet access provider of the subscriber A and the requests emitted by an item of equipment $E_B$ are oriented towards the items of equipment of the Internet access provider of the subscriber B. The return data travel through the same path.

Step 10: When the modem-router MR' is disconnected from the internal handler of the dwelling of the subscriber A, a disconnection signal is transmitted to the Internet access provider of the subscriber A. The disconnection of the modem-router MR' is therefore the element triggering the generation and the transmission of the disconnection signal. The modem-router MR' may, for example, automatically emit the disconnection signal. Such disconnection signal is transmitted via the transmission line LA, preferably in destination of the $DSLAM_A$. The $DSLAM_A$ (or another item of equipment of the Internet access provider of the subscriber A) may also poll the modem-router MR' by periodically transmitting thereto presence requests ("are you present?"). While the modem-router MR' responds to the presence requests, the $DSLAM_A$ deduces that the modem-router MR' is indeed connected to the internal handler of the dwelling of the subscriber A. And, in the absence of response, the $DSLAM_A$ deduces that the modem-router MR' is disconnected from the internal handler of the dwelling of the subscriber A. In another alternative embodiment, it is the modem-router MR' that periodically transmits to the $DSLAM_A$ (or to another item of equipment of the Internet access provider of the subscriber A) presence messages ("I am present"). While the $DSLAM_A$ receives the presence messages, it deduces that the modem-router MR' is indeed connected to the internal handler of the dwelling of the subscriber A. And in the absence of receipt of the presence messages, the $DSLAM_A$ deduces that the modem-router MR' is disconnected from the internal handler.

Step 11: When the Internet access provider of the subscriber A is informed of the disconnection of the modem-router MR', it generates and transmits to the Internet access provider of the subscriber B, a session closure signal. The receipt of the disconnection signal is the element triggering the generation and the transmission of the session closure signal. In FIG. 8, it is the $DSLAM_A$ that generates and transmits to the $DSLAM_B$ the session closure signal.

Step 12: When the Internet access provider of the subscriber A is informed of the disconnection of the modem-router MR', it generates and transmits to the multiplexer MUX ($R_{MUX}$, $SR_{MUXA}$ or $DSLAM_{MUXA}$), a control signal in order to stop the multiplexing of the transmission line LA of the subscriber A, so that only the numerical data associated with the connection parameters of the subscriber A pass through the transmission line LA. The receipt of the session closure signal is the element triggering the generation and the transmission of the stop control signal. In FIG. 8, it is the $DSLAM_A$ that generates and transmits such stop control signal. This Step 12 may be implemented before or after Step 11.

In response to the receipt of the session authorization signal (Step 8), the modem-router MR' may generate and transmit a session electronic signature to the Internet access provider of the subscriber B and/or to the Internet access provider of the subscriber A, and more specifically to the $DSLAM_B$ and/or to the $DSLAM_A$. Such session electronic signature may notably include the following numerical data: unique identifier (for example, IMSI) of the subscriber B, date, time, IP address of the modem-router MR'. Such session electronic signature makes it possible to track the connection histories of the subscriber B when he uses the modem-router MR' from the internal handler of the dwelling of the subscriber A.

In accordance with the invention, the terminating point $P_A$ is likely to simultaneously receive the numerical data associated with the connection parameters of the subscriber B and the numerical data associated with the connection parameters of the subscriber A.

FIG. 9A illustrates an embodiment where the telephone plug adapter P' orients, towards the modem-router MR', the numerical data "A" associated with the connection parameters of the subscriber A and the numerical data "B" associated with the connection parameters of the subscriber B. The telephone plug adapter P' also orients towards to the native modem-router $MR_A$ the data flow "A+B". The modem-router MR' therefore receives the data flow "A+B" and performs a demultiplexing in order to only process (demodulate) the data "B". Similarly, the modem-router $MR_A$ receives the same data flow "A+B" and performs a demultiplexing in order to only process (demodulate) the data "A".

FIG. 9B illustrates another embodiment where the native modem-router $MR_A$ is not capable of performing a demultiplexing of the data flow "A+B", only the modem-router MR' having this capacity. In this case, the telephone plug adapter P' diverts the data flow towards the modem-router MR'. The latter performs a demultiplexing in order to process the data "B" and send back the data "A" towards the telephone plug adapter P' which transmits same to the native modem-router $MR_A$ for processing.

Figure 10:
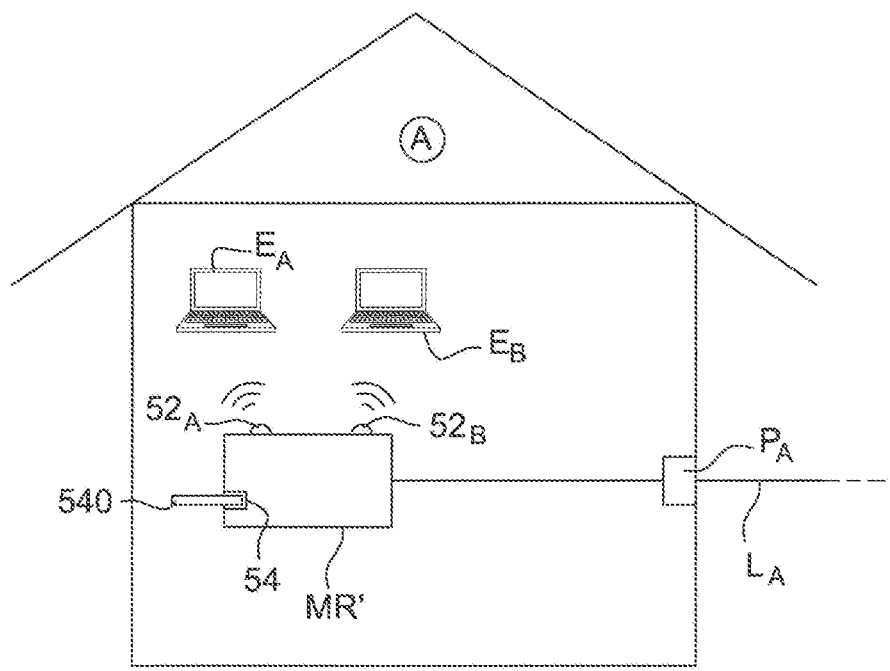
FIG. 10 illustrates a modem-router in accordance with the invention, connected directly to the terminating point, FIG. 11 schematizes the arrangement of various components of the modem-router illustrated in FIG. 10.

FIG. 10 illustrates an alternative embodiment where the modem-router MR' comes to replace the native modem-router $MR_A$. Therefore, it is the subscriber A that does the acquisition of the modem-router MR'.

Figure 11:
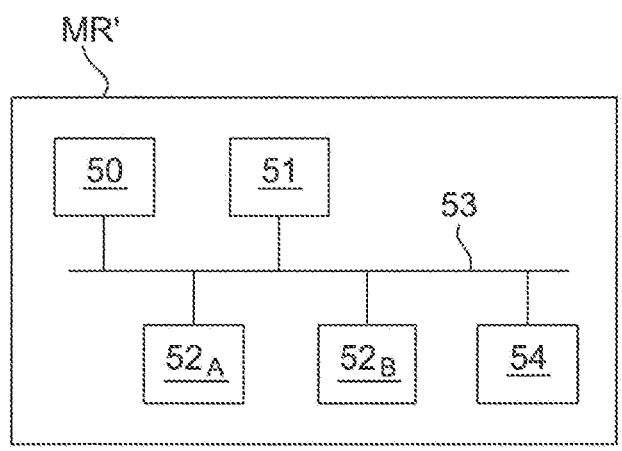

By referring to FIG. 11, the modem-router MR' comprises one or more processors or microprocessors 50, one or more memories 51, at least two network interfaces 52A, 52B, which are mutually connected via a bus 53. These various components are already described previously in reference to FIG. 4. One or more computer applications—or computer programs—are saved in the memory or memories 51 and the instructions of which, when they are run by the processor or processors 50 make it possible to produce the functions described above in the description and notably the modulation, demodulation, multiplexing, demultiplexing of numerical data.

The network interface 52A is a wired or wireless communication interface adapted to establish a communication with the items of equipment $E_A$ of the subscriber A, by using, for example, the private security key associated with the connection parameters of the subscriber A. And the network interface 52B is a wired or wireless communication interface adapted to establish a communication with the items of equipment $E_B$ of the subscriber B, by using, for example, the private security key associated with the connection parameters of the subscriber B. Such network interfaces 52A, 52B are similar to the network interface 52 described previously in reference to FIG. 4.

In this embodiment, the modem-router MR' further comprises a connection interface 54 for smart card, SIM card, or USB stick. This connection interface 54 is thus adapted to receive a secure removable media device 540 wherein are saved numerical data. In practice, these numerical data contain the connection parameters of the subscriber B or at least identification data of the account of the subscriber B, and notably his subscriber unique identifier. The Internet access provider of the subscriber B may provide the latter with the secure removable media device 540 pre-parametrized. The subscriber B may also parametrize himself the media device 540, prior to his installation in the dwelling of the subscriber A. The subscriber B thus simply needs to transport the secure removable media device 540, the overall size of which is smaller than same of the modem-router MR', the removable media device 540 being sufficient to recognize the subscriber B.

The modem-router MR' here is parametrized beforehand with the connection parameters of the Internet network access account of the subscriber A and notably with the following numerical data: unique identifier of the subscriber A, identification data of the Internet access provider of the subscriber A, private security key, optionally certain rights and/or restrictions open to the subscriber A, etc. Such parametrization is performed as described previously. The subscriber A may, for example, use a computer or a Smartphone that he connects to the modem-router MR'. The computer or the Smartphone acts as interface so that the subscriber A enters his connection parameters manually. The subscriber A connects in a wired (for example, with an Ethernet cable) or wireless (for example, by Wi-Fi) manner the modem-router MR' to his native modem-router $MR_A$. In response to this connection, or in response to the activation of a dedicated key installed on the box of the modem-router MR', all of the connection parameters saved in the native modem-router $MR_A$ are copied in the memory 51 of the modem-router MR'. The connection parameters may also be saved in a secure removable media device made available for the subscriber A.

The modem-router MR' is connected directly to the internal handler of the dwelling of the subscriber A, in the same way as the native modem-router $MR_A$.

Figure 12:
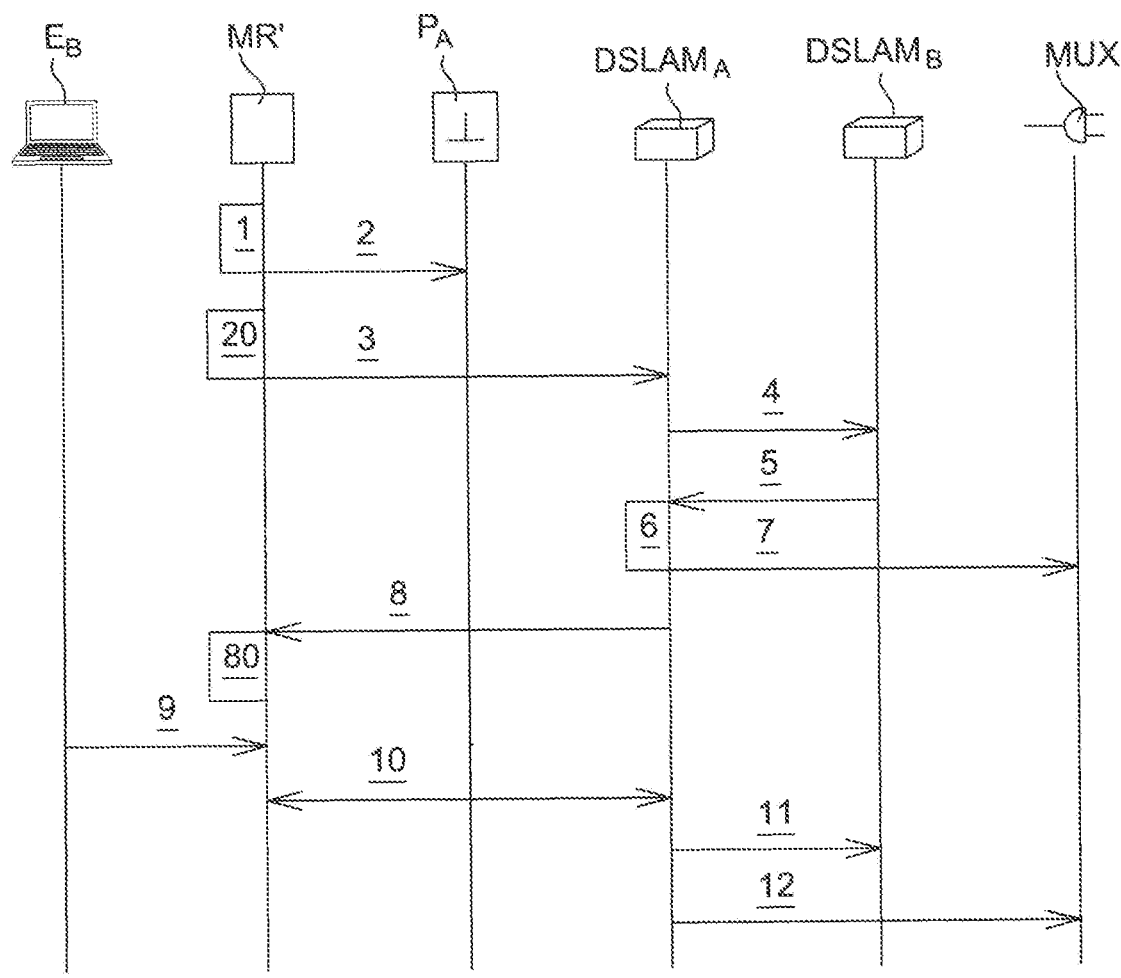
FIG. 12 illustrates various steps implemented in the method subject matter of the invention, with the modem-router illustrated in FIG. 10.

FIG. 12 illustrates various steps implemented in the method subject matter of the invention, with the modem-router MR' in FIGS. 10 and 11.

Event 1: The modem-router MR' is parametrized with the connection parameters of the Internet network access account of the subscriber A.

Step 2: Connection of the modem-router MR' to the terminating point $P_A$. This Step 2 may be implemented before or after Event EV1.

Event 20: The secure removable media device 540 is inserted into the connection interface 54.

Step 3: The modem-router MR' generates and transmits an authentication request to the Internet access provider of the subscriber A. The insertion of the secure removable media device 540 into the connection interface 54 is the element triggering the generation and the transmission of the authentication request. This step is identical to Step 3 described in reference to FIG. 8.

Step 4: The Internet access provider of the subscriber A generates and transmits to the Internet access provider of the subscriber B, a polling request. This step is identical to Step 4 described in reference to FIG. 8.

Step 5: The Internet access provider of the subscriber B verifies that the subscriber B is indeed affiliated therewith and, after verification, generates and transmits to the Internet access provider of the subscriber A an authorization signal. This step is identical to Step 5 described in reference to FIG. 8. Nevertheless, the authentication signal may further contain data relating to the connection parameters of the subscriber B, in the case where the secure removable media device 540 only contains the unique identifier of the subscriber B. The connection parameters of the subscriber B are in this case saved beforehand in an item of equipment (for example, a database) of the Internet access provider of the subscriber B.

Event 6: In response to the receipt of the authorization signal, the Internet access provider of the subscriber A opens the access rights to the subscriber B. This event is identical to Event 6 described in reference to FIG. 8.

Step 7: The Internet access provider of the subscriber A generates and transmits to the multiplexer MUX ($R_{MUX}$, $SR_{MUXA}$ or $DSLAM_{MUXA}$), a control signal in order to multiplex the transmission line LA of the subscriber A. This step is identical to Step 7 described in reference to FIG. 8.

Step 8: The Internet access provider of the subscriber A generates and transmits to the modem-router MR', a session authorization signal. This step is identical to Step 8 described in reference to FIG. 8. The session authorization signal may contain the data relating to the connection parameters of the subscriber B transmitted in Step 5.

Event 80: In response to the receipt of an authorization signal containing the data relating to the connection parameters of the subscriber B, the modem-router MR' is automatically parametrized with the connection parameters of the Internet network access account of the subscriber B.

Step 9: The item or items of equipment $E_B$ of the subscriber B can now connect to the modem-router MR', via a wired or wireless connection and navigate on the Internet with the connection parameters of the subscriber B. The wired or wireless connection is established via the interface 52B reserved for the subscriber B, with the private security key associated with the connection parameters of the subscriber B. Similarly, the subscriber A will be able to continue connecting his item or items of equipment $E_A$ to the modem-router MR', via a wired or wireless connection and navigate on the Internet with the connection parameters of the subscriber A. The wired or wireless connection is established via the interface 52A reserved for the subscriber A, with the private security key associated with the connection parameters of the subscriber A. This step is identical to Step 9 described in reference to FIG. 8.

Step 10: When the secure removable media device 540 is withdrawn from the connection interface 54, a disconnection signal is transmitted to the Internet access provider of the subscriber A. The withdrawal of the secure removable media device 540 is therefore the element triggering the generation and the transmission of the disconnection signal. The modem-router MR' may, for example, emit such disconnection signal. The generation and the transmission of the disconnection signal are identical to same described in reference to Step 10 in FIG. 8.

Step 11: When the Internet access provider of the subscriber A is informed of the disconnection of the modem-router MR', it generates and transmits to the Internet access provider of the subscriber B, a session closure signal. This step is identical to Step 11 described in reference to FIG. 8.

Step 12: When the Internet access provider of the subscriber A is informed of the disconnection of the modem-router MR', it generates and transmits to the multiplexer MUX ($R_{MUX}$, $SR_{MUXA}$ or $DSLAM_{MUXA}$), a control signal in order to stop the multiplexing of the transmission line LA of the subscriber A. This step is identical to Step 12 described in reference to FIG. 8.

Figure 13:
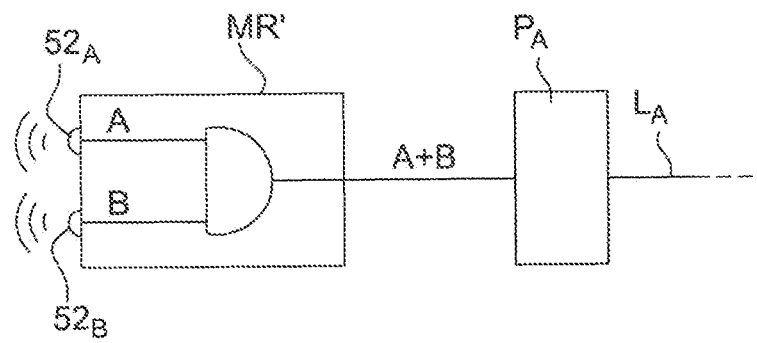
FIG. 13 illustrates an orientation of the data flows traveling through the modem-router illustrated in FIG. 10.

In reference to FIG. 13, the terminating point $P_A$ is likely to simultaneously receive the numerical data "A" associated with the connection parameters of the subscriber A and the numerical data "B" associated with the connection parameters of the subscriber B. The modem-router MR' therefore receives the data flow "A+B" and performs a demultiplexing of this data flow "A+B". The data "A" travel via the network interface 52A and the data "B" travel via the network interface 52B. The modem-router MR' may therefore be used simultaneously by the subscribers A and B, same keeping their own Internet network access accounts and their own connection parameters. Of course, if the subscriber A does not connect any of his items of equipment $E_A$ to the modem-router MR', said latter will only be used by the item or items of equipment $E_B$ of the subscriber B, and vice versa if the subscriber B does not connect any of his items of equipment $E_B$ to the modem-router MR'.

The preceding description makes reference to subscribers A and B each having a different Internet access provider. Nevertheless, the invention also applies to the case where the subscribers A and B have the same Internet access provider. In this hypothesis, the $DSLAM_A$ and $DSLAM_B$ belong to such common provider and are generally located in MDFs that are distinct and remote from one another.

The arrangement of the various elements and/or means and/or steps of the invention, in the embodiments described hereinabove, must not be understood as requiring such an arrangement in all of the implementations. In any case, it will be understood that various modifications can be made to such elements and/or means and/or steps, without deviating from the spirit and scope of the invention.

The invention claimed is:

1. A method for creating accounts for accessing the Internet network through a unique terminating point of a premise provided with an internal handler,
the terminating point is adapted to authorize the transmission of numerical data to the internal handler, the numerical data are associated with connection parameters of a first native Internet network access account of a first subscriber, the first native internet network access being provided by an internet access provider, the method comprising:
transmitting to the internal handler, through the terminating point, in addition to the numerical data associated with the connection parameters of the native account of the first subscriber, other numerical data associated with connection parameters of a second Internet network access account of a second subscriber,
the connection parameters of the second account being different from the connection parameters of the first native account,
wherein for each of the two subscribers to connects to the Internet network with his own connection parameters through the terminating point shared between the two subscribers, the method further comprises:
parametrizing a modem-router with the connection parameters of the second account,
connecting the modem-router to the internal handler,
transmitting to the modem-router a session authorization signal authorizing the modem-router to process the numerical data associated with the connection parameters of the second account and which travel through the terminating point, which signal is emitted from an item of equipment of the Internet access provider.

2. The method according to claim 1, wherein:
the modem-router generates an authentication requests containing identification data of the second access account and transmits the authentication request to an item of equipment of the Internet access provider of the first subscriber,
the connection of the modem-router to the internal handler, or
the insertion of a secure removable media device into a connection interface of the modem-router,
being the element for triggering the generation and the transmission of the authentication request,
the item of equipment of the Internet access provider of the first subscriber generates and transmits to an item of equipment of the Internet access provider of the second subscriber a polling request aiming to verify that the second subscriber is indeed affiliated with the access provider identified in the authentication request, the receipt of the authentication request being the element triggering the generation and the transmission of the polling request,
the item of equipment of the Internet access provider of the second subscriber verifies that the second subscriber is indeed affiliated with the access provider identified in the authentication request, the receipt of the polling request being the element triggering the verification procedure; and, in case of positive verification, the item of equipment of the Internet access provider of the second subscriber generates and transmits to the item of equipment of the Internet access provider of the first subscriber an authorization signal,
the receipt of the authorization signal results in the generation and the transmission of the session authorization signal, by the item of equipment of the Internet access provider of the first subscriber to the modem-router.

3. The method according to claim 1, wherein in connecting the terminating point to a transmission line connected to an item of equipment of an Internet access provider managing the native account and multiplexing the transmission line so that the numerical data associated with the connection parameters of the second account of the second subscriber and the numerical data associated with the connection parameters of the native account of the first subscriber simultaneously travel through the transmission line.

4. The method according to claim 3, wherein the connection of the modem-router to the internal handler is a triggering element resulting in the automatic implementation of a logical computer process leading to the multiplexing of the transmission line.

5. The method according to claim 3, wherein the disconnection of the modem-router from the internal handler is a triggering element resulting in the automatic implementation of a logical computer process leading to the stopping of the multiplexing of the transmission line.

6. The method according to claim 3, wherein the insertion of the secure removable media device into the connection interface is a triggering element resulting in the implementation of a logical computer process leading to the multiplexing of the transmission line.

7. The method according to claim 3, wherein the withdrawal of the secure removable media device from the connection interface is a triggering element resulting in the automatic implementation of a logical computer process leading to the stopping of the multiplexing of the transmission line.

8. The method according to claim 1, wherein integrating into the session authorization signal data relating to the connection parameters of the second account, the receipt of the session authorization signal by the modem-router, resulting in the automatic parametrization of the modem-router with the connection parameters.

9. The method according to claim 1, wherein parametrizing the modem-router:
by connecting the modem-router to an electronic device serving as interface,
then by manually entering the connection parameters of the second account through the electronic device serving as interface,
and by saving the connection parameters in a memory of the modem-router.

10. The method according to claim 1, wherein parametrizing the modem-router:
by connecting the modem-router to another modem-router already parametrized with the connection parameters of the second account,
and copying all of the connection parameters saved in the other modem-router in a memory of the modem-router.

11. The method according to claim 1, further comprising:
saving in a secure removable media device the connection parameters of the second account,
equipping the modem-router with a connection interface adapted to receive the secure removable media device,
the insertion of the secure removable media device into the connection interface is a triggering element resulting in the automatic parametrization of the modem-router with the connection parameters of the second account saved in the secure removable media device.

12. The method according to claim 1, further comprising:
saving in a secure removable media device identification data of the second account,
equipping the modem-router with a connection interface adapted to receive the secure removable media device,
the insertion of the secure removable media device into the connection interface is a triggering element resulting in the automatic implementation of a logical computer process leading to the automatic parametrization of the modem-router with the connection parameters of the second account.

13. The method according to claim 1, wherein connecting the modem-router between the terminating point and a native modem-router connected to the internal handler, which native modem-router is parametrized with the connection parameters of the first native account, an item of equipment of the second subscriber not being able to communicate with the native modem-router without knowledge of the connection parameters of the first native account and an item of equipment of the first subscriber not being able to communicate with the modem-router without knowledge of the connection parameters of the second account.

14. The method according to claim 13, wherein receiving in the native modem-router, the numerical data associated with the connection parameters of the first native account and the numerical data associated with the connection parameters of the second account which travel through the terminating point, and only processing in the native modem-router the numerical data associated with the connection parameters of the first native account.

15. The method according to claim 13, further comprising:
receiving in the modem-router, the numerical data associated with the connection parameters of the first native account and the numerical data associated with the connection parameters of the second account which travel through the terminating point,
only processing in the modem-router the numerical data associated with the connection parameters of the second account,
sending back towards the native modem-router and from the modem-router, the numerical data associated with the connection parameters of the first native account.

16. The method according to claim 1, wherein parametrizing the modem-router with the connection parameters of the second account and with the connection parameters of the first native account so that the modem-router processes the numerical data associated with the connection parameters of the first native account and the numerical data associated with the connection parameters of the second account, and which travel through the terminating point, the modem-router being adapted to be used simultaneously by the first subscriber and the second subscriber, same keeping their own Internet network access accounts and their own connection parameters.

17. The method according to claim 1, wherein in response to the receipt of the session authorization signal, the modem-router generates and transmits a session electronic signature to an item of equipment of the Internet access provider of the second subscriber and/or to the Internet access provider of the first subscriber, which signature is used to track the connection histories of the second subscriber when he uses the modem-router from the internal handler of the dwelling of the first subscriber.

* * * * *